UNITED STATES PATENT OFFICE.

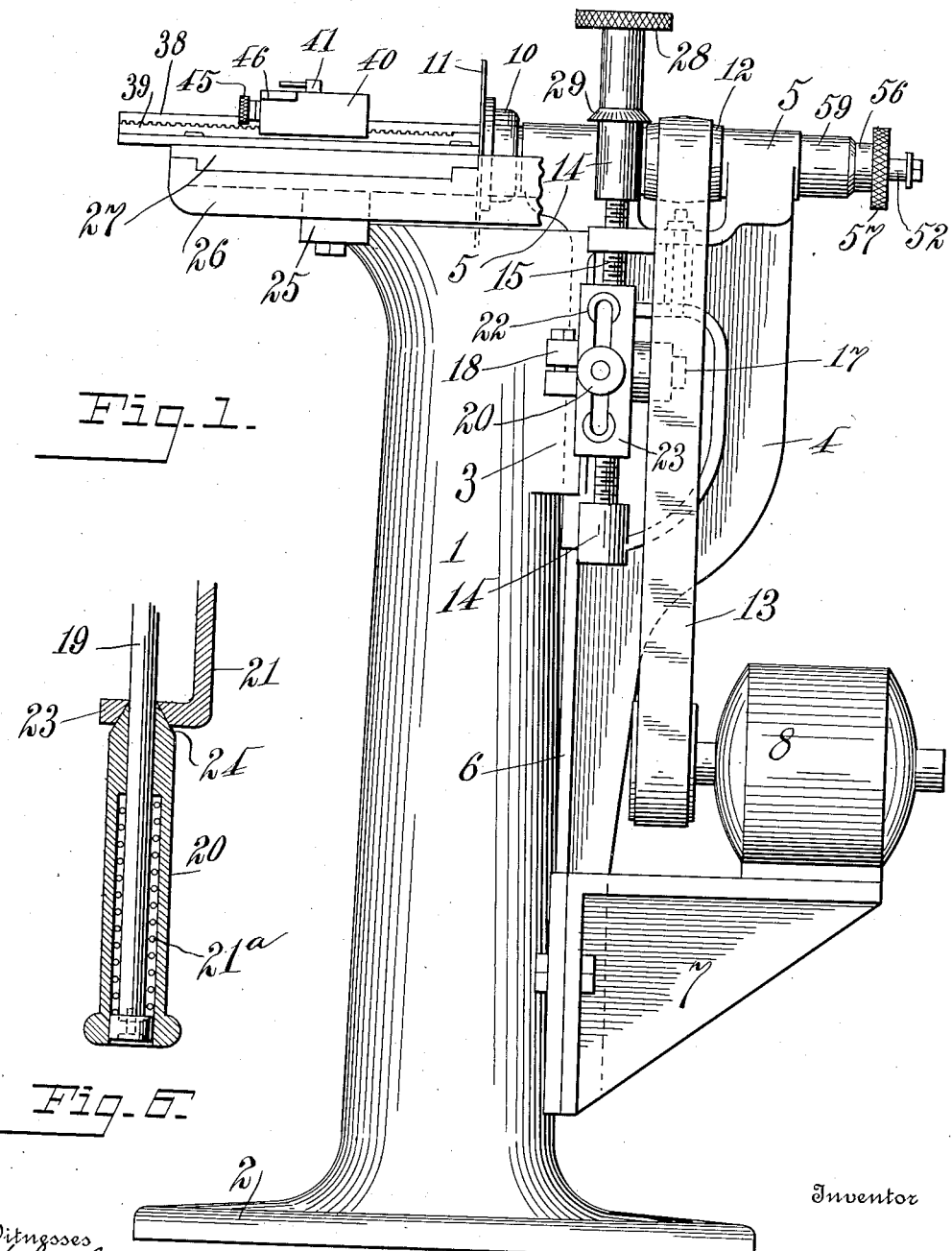
K. HOEPFNER.
METAL SAW AND TRIMMER.
APPLICATION FILED DEC. 4, 1912.
1,082,521.
Patented Dec. 30, 1913.
3 SHEETS—SHEET 1.

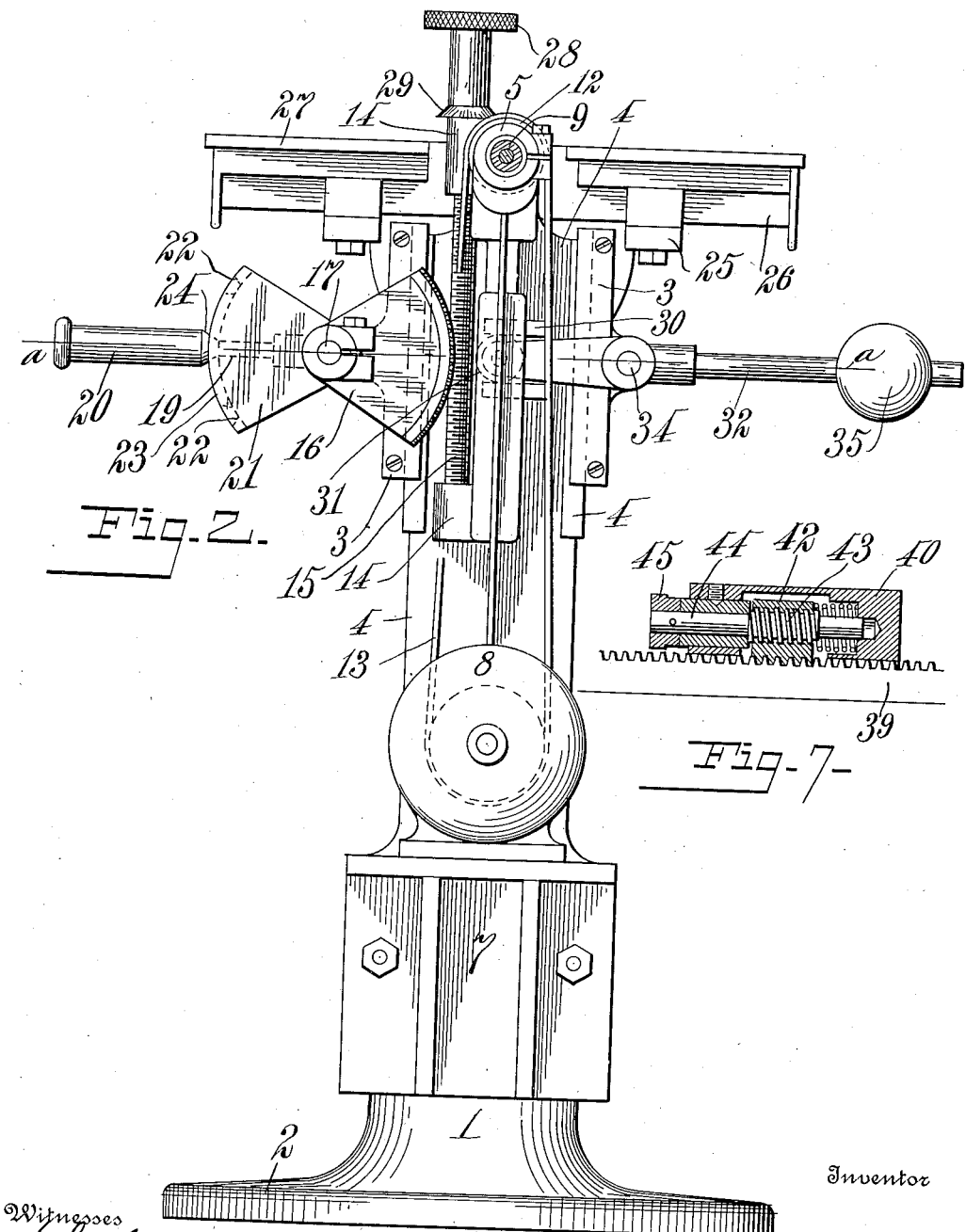

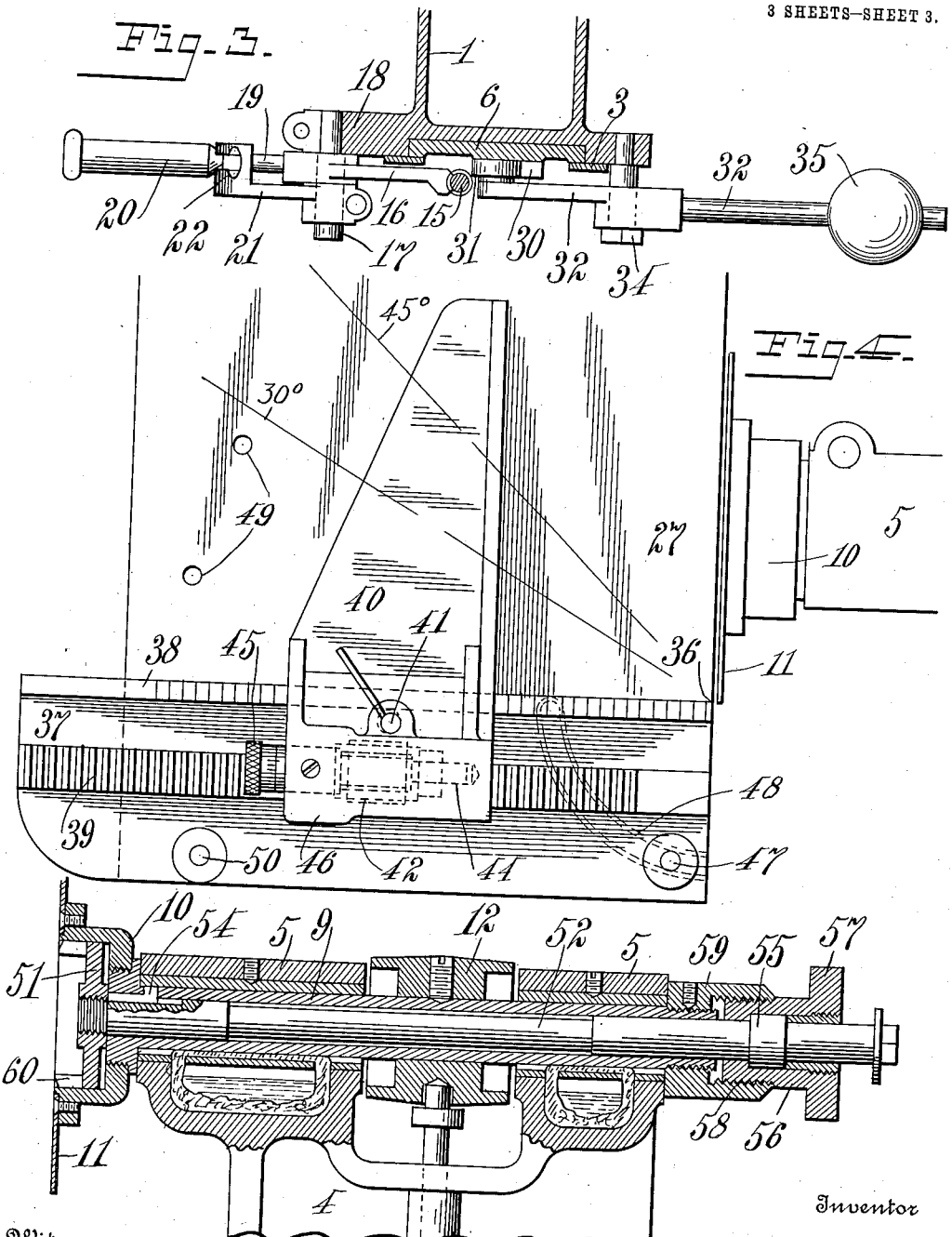

KARL HOEPFNER, OF DAYTON, OHIO.

METAL SAW AND TRIMMER.

1,082,521.  Specification of Letters Patent.  Patented Dec. 30, 1913.

Application filed December 4, 1912. Serial No. 734,870.

*To all whom it may concern:*

Be it known that I, KARL HOEPFNER, a subject of the Emperor of Germany, residing at Dayton, in the county of Montgomery and State of Ohio, have invented certain new and useful Improvements in Metal Saws and Trimmers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in combined metal-saws and trimmers especially adapted for sawing and trimming electrotypes. It is, however, adapted for sawing other metallic and hard materials.

The object of the invention is to provide means for instantaneously elevating and lowering the saw relatively to the table. Heretofore, means have been provided for elevating and lowering the table relatively to the saw by a comparatively slow-acting mechanism. This has been found objectionable owing to the time lost in operating the saw. For example, in cutting a piece of material of such a size that the saw arbor or mandrel will strike the edge of said material before the cut is finished, it is impossible to complete the work unless the mandrel is lowered so that it passes underneath the work. Heretofore, this has been done by a slow-moving element, such as a screw threaded into a nut which necessitates several rotations of the screw before the saw can be lowered to the desired position. The weight of the table must be borne by the screw in this operation which is objectionable and adds to the inconvenience and slowness of the operation. The present invention overcomes these objections in that it provides means for obtaining a much quicker adjustment of the saw relative to the table and does not impose upon the operator the weight of the table in adjusting the same. In the present invention the screw acts as a rack in connection with a segment gear which in turn is operated by a lever to obtain the quicker adjustment. In obtaining the finer or more delicate adjustments, the screw operates in connection with a nut as will be hereinafter fully described.

Referring in general terms to the accompanying drawings, Figure 1 is a front elevation of a saw embodying my invention; Fig. 2 is a side elevation thereof; Fig. 3 is a section on the line *a—a* of Fig. 2; Fig. 4 is a top plan view of the table showing the gage mounted thereon; Fig. 5 is a vertical longitudinal sectional view through the mandrel. Fig. 6 is a detail sectional view of the platen-controlling lever. Fig. 7 is a detail sectional view of the micrometer adjustment for the gage.

Referring more particularly to said drawings, 1 represents a standard provided with a base 2 and guides 3. Mounted in the guides 3 is a frame 4 provided with horizontal bearings 5 and a downward extension 6 which receives a lower bracket 7 upon which a motor 8 is mounted. Mounted in the bearings 5 is a mandrel 9 provided with a head 10 which receives a rotary saw 11. This is more clearly seen in Fig. 5. The mandrel 9 is provided with a pulley 12 which is connected by a belt 13 with the motor. The frame 4, the mandrel 9, the motor 8, and the saw 11 are vertically movable in the guides 3, and are moved by and held in a set position by the following means: The said frame 4 has alined vertical bearings 14 which receive a rack or adjusting screw 15. In engagement with said adjusting screw 15 is a worm segment 16 journaled on a stud 17 mounted in a projection 18 extending from the standard 1. The segment 16 is oscillated by an arm 19 provided with a sliding handle 20 controlled by a spring 21ª. The handle 20 is provided with a conical portion 24 adapted to rest in upper and lower recesses 22 in the flange 23 of a segment 21. The segment 21 is rigidly secured to the stud 17. When the saw 11 is in a lower position, the conical portion 24 rests in the upper recess 22, and when it is desired to elevate said saw, the handle 20 is moved longitudinally on the arm 19 and is then depressed until the spring 21ª within said handle moves the conical portion 24 into the lower recess 22.

Mounted on the upper end of the standard 1 and secured by lugs 25 is a stationary table 26 upon which is mounted a sliding table 27. When the conical portion 24 of the handle 20 rests in the upper recess 22, the mandrel 9 lies below the tables 26 and 27, and when said conical portion rests in the lower recess 22, the said mandrel lies above the table. To obtain a fine or delicate adjustment between the table and saw, for example, when the saw is in either an upper or lower position, the adjusting screw 15 is provided with a hand wheel 28 by which it may be rotated. When rotated, the worm segment 16 will be held stationary by the segment 21 and will act as a nut for the motor 8, mandrel 9 and saw 11. The hand wheel 28 is provided with a conical flange 29 which is calibrated to facilitate adjustment.

To balance the frame 4 and the parts carried thereby, said frame is provided with lugs 30 which receive a roller 31. The said roller 31 is mounted on one end of a lever 32 pivoted at 34 to the standard 1, while the opposite end carries an adjustable weight 35. The weight 35 compensates or balances the weight of the saw-carrying parts to any extent which relieves the operator and makes the device sensitive. That is to say, the position of the weight may be such as to relieve the saw-carrying parts entirely, so that the operator is relieved of the weight of the saw-carrying parts in elevating the same.

To maintain the work in position upon the table 27 when being acted upon by the saw, the following gage is provided: Mounted on the sliding table 27 and pivoted about a point 36 is a guide 37 provided with a flange 38 and a rack 39. Slidingly mounted on the guide 37 is a gage 40 provided with an eccentric clamp 41 adapted to engage the flange 38. The flange 38 is provided with calibrations to facilitate the positioning of the gage 40. A micrometer adjustment is also provided to permit the gage to be set intermediate of the calibrations on the flange 38. The head of said gage 40 is provided with a pocket which receives a nut 42 in engagement with the rack 39. Extending through the nut 42 is a screw 43, the stem 44 of which is journaled in the head of the gage and is provided with a thumb head 45 having the well known micrometer calibrations thereon. The head of the gage 40 is provided with finger members 46 by means of which said gage may be elevated and slid along the guide. The work to be acted upon by the saw rests in the angle formed by the guide 37 and the gage. When said gage is in a normal position, the guide 37 lies at a right angle to the saw while the gage lies parallel with the same. When it is desired to operate on the work at an angle, the guide 37 and the gage is swung around the point 36 to the desired angle, the guide being guided by a pin 47 which slides in a dovetailed slot 48, which is radial with the point 36, and which is shown in dotted lines, Fig. 4. To maintain the gage 40 and guide 37 at the standard angles of thirty and forty-five degrees, the table 27 is provided with suitable positioned openings 49, and which are adapted to receive a pin 50 mounted in the guide 37.

To bevel the edges of electrotypes, etc., the following device is provided: Mounted in the saw head 10 is a cutter head 51 provided with cutters 60 having their cutting edges at the desired angle. (See Fig. 5). The head 51 is mounted on a shaft 52 located within the mandrel 9. The shaft 52 is splined to the mandrel by means of a key 54 and is provided with a collar 55 which lies within an adjustable head 56. The said head 56 is provided with a hand wheel 57 and screw-threads 58. The said head 56 engages a head 59 attached to the mandrel 9. When the hand wheel 57 is rotated, relative to the mandrel, the shaft 52 is moved longitudinally relative to said mandrel and the cutters 60 may be projected past the face of the saw when they will be in a position to engage the edge of the electrotype.

Without limiting myself to the precise arrangement shown and described which may be varied within the scope of the claims, I claim, 1. In a saw of the type specified, the combination with a table, of a longitudinally adjustable frame, a saw-mandrel journaled in said frame, and a motor supported on said frame and connected with said mandrel, means comprising a screw and segment gear for shifting said frame vertically to bring the saw to positions above or below the table, and means for adjusting the saw independently of the movement given it through the movement of the frame, said last named means comprising a hand-operative connection with said screw, substantially as specified.

2. In a saw of the type specified, the combination with a table, of a vertically longitudinally adjustable frame, a saw-mandrel journaled in said frame, a motor supported on said frame and connected with said mandrel, an adjusting screw mounted on said frame, a segmental gear engaging said screw, a handle for operating said segmental gear to raise or lower said frame, and a counterbalancing weight connected with said frame, substantially as described.

3. In a saw of the type specified, the combination with a table, of a vertically longitudinally adjustable frame, a saw mandrel and a motor supported on said frame, a screw mounted on said frame for obtaining a finer adjustment of the saw relative to the table, a segmental gear engaging said screw to raise or lower the saw relatively to the table, a lever for operating said segmental gear, means on said screw for operating it independently of said segmental gear, a counter-balancing weight connected to said frame, and means acting upon said screw for obtaining a finer adjustment of the saw relative to the table, substantially as specified.

4. In a saw of the type specified, a table, a guide, a rack thereon, a gage slidingly mounted on said guide, a nut inclosed in said gage and engaging said rack, and a screw inclosed in said gage and engaging said nut and by means of which the gage may be adjusted on said guide.

In testimony whereof I affix my signature, in presence of two witnesses.

KARL HOEPFNER.

Witnesses:
MELLIE GALLOWAY,
MATTHEW SIEBLER.